United States Patent
Cooper et al.

(10) Patent No.: US 9,563,536 B1
(45) Date of Patent: Feb. 7, 2017

(54) PERFORMANCE NEUTRAL ISOLATION OF RUNTIME DISCREPANCIES IN BINARY CODE

(71) Applicant: International Business Machines Corporation, Armonk, NY (US)

(72) Inventors: Steven Cooper, Ontario (CA); Reid T. Copeland, Ontario (CA); Toshihiko Koju, Chiba (JP); Roger H. E. Pett, Ontario (CA); Trong Truong, Ontario (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/886,913

(22) Filed: Oct. 19, 2015

(51) Int. Cl.
G06F 11/36 (2006.01)
G06F 9/44 (2006.01)

(52) U.S. Cl.
CPC .................................. G06F 11/3612 (2013.01)

(58) Field of Classification Search
None
See application file for complete search history.

(56) References Cited

U.S. PATENT DOCUMENTS

| | | | |
|---|---|---|---|
| 8,060,869 B1 * | 11/2011 | Panchenko | G06F 8/44 711/3 |
| 8,230,402 B2 | 7/2012 | Chen et al. | |
| 8,418,149 B2 | 4/2013 | Krauss | |
| 8,732,673 B2 | 5/2014 | Finking et al. | |
| 2009/0158099 A1 * | 6/2009 | Cui | G06F 11/0748 714/57 |
| 2010/0162217 A1 | 6/2010 | Morrison | |
| 2010/0275074 A1 * | 10/2010 | Nicolaidis | G11C 29/56 714/718 |
| 2014/0032976 A1 * | 1/2014 | Shin | G06F 11/3409 714/47.1 |
| 2014/0331210 A1 | 11/2014 | Bowler et al. | |
| 2015/0234736 A1 | 8/2015 | Koju et al. | |
| 2015/0370695 A1 | 12/2015 | Koju et al. | |

OTHER PUBLICATIONS

Kumar et al; Tdb: A Source-level Debugger for Dynamically Translated Programs, AADEBUG'05, Sep. 19-21, 2005, Monterey, California, USA.

* cited by examiner

*Primary Examiner* — Daxin Wu
(74) *Attorney, Agent, or Firm* — Garg Law Firm, PLLC; Rakesh Garg; Isaac Gooshaw

(57) ABSTRACT

Without using a high-level programming language source code, a set of sync points is identified in an initial binary code. The initial binary code is executed at a first system. A value of the user data is captured from a user space of a memory as a baseline of the user data. A set of comparative sync points is identified in a second binary code. During an execution of the second binary code, a second value of the user data from a second user space of a second memory is found to fail in matching the baseline of the user data. An instruction before the comparative sync point in the second binary code is identified as a location of a faulty operation due to the failing.

20 Claims, 6 Drawing Sheets

PERFORMANCE NEUTRAL ISOLATION OF RUNTIME DISCREPANCIES IN BINARY CODE

TECHNICAL FIELD

The present invention relates generally to a method, system, and computer program product for debugging machine language code. More particularly, the present invention relates to a method, system, and computer program product for performance neutral isolation of runtime discrepancies in binary code.

BACKGROUND

A traditional compiler takes source code in a high-level programming language, such as C, C++, COBOL, PL/I, or some other equivalent high level semantic representation of the source code as input. The traditional compiler compiles or converts the high-level source code into machine language code, i.e., binary code in ones and zeros that is executable on a machine (data processing system).

In contrast, 'binary optimization' or 'binary translation' is a compilation process that takes machine code in binary language as input and recompiles the machine code to a different machine code that is suitable for execution on the same or a different machine architecture. A binary optimization tool performs this binary optimization process.

Binary optimization is needed and used particularly in those cases where the binary code is machine-dependent or machine-architecture specific. For example, a twenty year old machine may have employed an instruction set for which an initial binary code may have been created. When that old machine has to be replaced by a new machine, the instruction set of the new machine may differ from the instruction set of the old machine. Accordingly, even if the new instruction set is backward compatible, the initial binary code may not execute efficiently on the new machine because the initial binary code fails to take advantage of the optimizations and efficiencies of the new architecture of the new machine, which can be exploited by the new instruction set.

In some cases, the source code from which the initial binary code was created is lost, or otherwise unavailable. Another common reason, especially in the case of COBOL, is that the appropriate skills and knowledge to modify or recompile the source code for performance improvement are not easily available. Thus, recompiling the same source code with a new complier that uses the new instruction set to produce a new binary code for the new machine is not always possible or even desirable. In these and many other circumstances, the initial binary code has to be translated, or optimized, for use on a different machine architecture, such as to use the new instruction set for a given target machine architecture. This binary-to-binary translation is interchangeably referred to hereinafter as 'binary optimization' or 'binary translation'.

SUMMARY

An embodiment identifies, using a processor, without using a high-level programming language source code, in an initial binary code, a set of sync points, a sync point being a place in the initial binary code where user data will have changed in a memory when the initial binary code is executed. The embodiment executes the initial binary code at a first data processing system. The embodiment captures a value of the user data from a user space of the memory as a baseline of the user data. The embodiment identifies in a second binary code, a set of comparative sync points, a comparative sync point being a place in the second binary code where the user data will have changed in a second memory when the second binary code is executed in a second data processing system. The embodiment finds, during an execution of the second binary code in the second data processing system, that a second value of the user data from a second user space of the second memory fails to match the baseline of the user data. The embodiment identifies, responsive to the finding, an instruction before the comparative sync point in the second binary code as a location of a faulty operation.

Another embodiment includes a computer program product for performing these operations, the computer program product comprising one or more computer-readable storage devices, and program instructions stored on at least one of the one or more storage devices.

Another embodiment includes a computer system for performing these operations, the computer system comprising one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
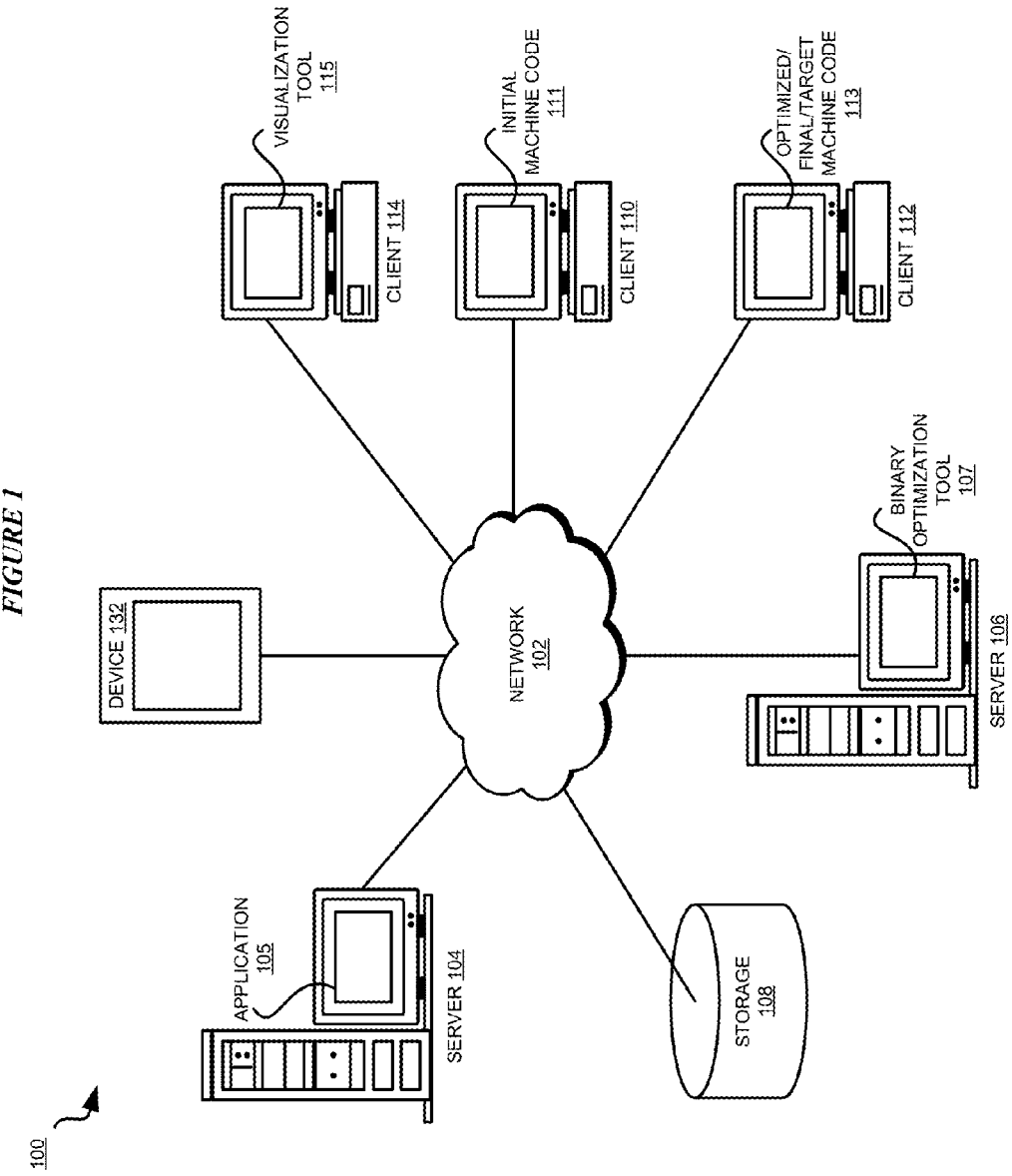
FIG. 1 depicts a block diagram of a network of data processing systems in which illustrative embodiments may be implemented.

Debugging is the process of resolving a faulty operation of code. When high-level programming language source code is compiled into machine language, it is easy to debug an operation of the code by stepping through the source code. It is also easy to modify the source code to include debugging code, such as by inserting print statements to output certain values when certain lines of the source code are executed.

The illustrative embodiments recognize that, absent a high-level language source code, debugging an operation of a binary code is extremely difficult. Essentially, a user is limited to examining the outputs that were originally programmed in the now-lost source code, which are now being produced by the binary code. The other recourse to a faulty operation of the binary code is to try to analyze the contents of a memory dump.

The illustrative embodiments recognize that the originally programmed outputs are often not helpful in resolving a faulty operation of the binary code. This is because an output may not be produced until many steps and memory manipulations after the faulty operation. Even if the output is incorrect, there can be, and often are, hundreds or thousands of operations that could have occurred before the output was produced, and any one of which could be the faulty operation.

The illustrative embodiments recognize that a memory dump is also largely unhelpful in isolating a faulty operation. For example, the memory dump does not particularly point to any particular region of the memory where the inspection should be focused. Furthermore, as with the originally programmed outputs, by the time a memory dump is produced, hundreds or thousands of operations could have occurred to manipulate the memory, and any one of which could be the faulty operation.

This debugging problem becomes even more complex when the binary code that is to be debugged is not even the original binary code generated from source code, but another binary that has been generated through a binary translation process from a previous binary code. Even if there were some manner of guessing a faulty operation in the original binary code, that guess work is not applicable to the new binary code which includes different instructions and perhaps optimizes the binary code by rearranging operations therein.

Thus, debugging binary code from binary translation is an extremely difficult problem, one that is not solvable by using traditional debuggers that require the source code for debugging. Even if debugging binary code were possible with some presently available debuggers, such debuggers would still lack the information about the part of the code that should be examined. Debugging binary code that results from a binary translation procedure is even harder due to differences in the instruction sets and the optimizing rearrangements of instructions between the original binary and the binary translated binary.

The illustrative embodiments used to describe the invention generally address and solve the above-described problems and other problems related to debugging binary code. The illustrative embodiments provide a method, system, and computer program product for performance neutral isolation of runtime discrepancies in binary code.

An embodiment can be implemented as a software application. The application implementing an embodiment can be configured as a modification of an existing debugging tool, or as a separate application that operates in conjunction with an existing debugging tool.

Initial binary code is a previously produced binary code. An initial binary code can be an original binary code or binary code produced by a previous manipulation of the original binary code. A binary optimization tool is a software application, which given an initial binary code, a specification of an originally targeted machine, and a specification of a new target machine, produces a binary optimized code suitable for executing on the new target machine. A binary optimization tool is also interchangeably referred to herein as a binary optimization compiler.

When binary code is executed, the code causes data manipulations in a memory of the machine on which the binary code is executed. The memory in a system is used for a variety of purposes. For example, an operating system of the machine uses an area of the memory called the "kernel space" to keep track of the machine's operations, including but not limited to the machine's operation in executing the binary code. Various applications executing on the machine manipulate data in a "user space" area of the memory.

The illustrative embodiments recognize that some manipulations in the user space of the memory are intended or programmed in the binary code, e.g., as a result of an original programming in the original source code. The illustrative embodiments recognize that many other manipulations in the user space of the memory are performed as a result of an operation inserted by the source code compiler, such as for housekeeping operations. A housekeeping operation is an internal management binary operation constructed by the source code compiler, which is inserted by the source code complier in the binary of the source code.

An embodiment instructs a compiler to identify a point in a given initial binary code where a manipulation is performed in a user data stored in a user area of a memory. In other words, an instruction from the embodiment causes the compiler to identify only those points at which a memory manipulation is being performed as a result of a binary instruction or operation that is not a housekeeping operation, i.e., the memory manipulation is being performed as a result of an instruction that has resulted from an intended operation in a source code. In one embodiment, the compiler is the binary optimization compiler. In another embodiment, the compiler is another compiler or binary code analysis tool.

Each such identified point is called a synchronizing point, or sync point. A binary optimization compiler identifies a set of one or more sync points in a given initial binary code. The embodiment creates a record of the set of sync points. The record is referred to herein as a listing file, and can take any suitable structure according to a particular implementation.

An embodiment executes the initial binary code, or causes the initial binary code to be executed, on a machine. At each sync point in the set or a subset of sync points in the listing file, the embodiment determines a state of the user data in the user space of the memory of the machine. The user data in the user space of the memory is that user data which is manipulated at the sync point.

In one embodiment, the machine where the initial binary code is executed is the old machine for which the initial binary code was originally compiled, or an equivalent thereof. Generally, a state of a memory, or a memory state, is a view or a representation of the contents of an area of the memory. Specifically, a state of the user data in the user space of the memory of the old machine is a value of the user data in the user space of the memory of the old machine. In other words, when the sync point is reached in the execution of the initial binary code, the user data has been manipulated by either writing of a value corresponding to the user data at an address in the memory, reading of a value corresponding to the user data at an address in the memory, or both. A state of the user data in the user space of the memory of the old machine at a sync point is referred to herein as an old user data state.

An embodiment saves the determined state of the user data in the user space of the memory of the old machine in a baseline data structure. Particularly, in the baseline, the embodiment associates the state of the user data with an identifier of the user data in the initial binary code and the sync point in the initial binary code.

An embodiment obtains a resulting binary code from a binary translation of the initial binary code. The resulting binary code is also interchangeably referred to here as an optimized binary code, final binary code, or target binary code.

The embodiment instructs a binary optimization compiler, such as the binary optimization compiler used to produce the optimized binary code, to identify in the optimized binary code, a set of points. Each point in the set of points in the optimized binary code has an equivalent sync point in the initial binary code, as recorded in the listing file. In other words, an instruction from the embodiment causes the binary optimization compiler to identify a point in the optimized binary code at which a memory manipulation is being performed (i) at a location in a new machine's memory similar to the location of the manipulation of a sync point in the listing file and (ii) in a manner similar to the manipulation of the sync point in the listing file. Such a point in the optimized binary file is referred to herein as a comparative sync point.

An embodiment executes the optimized binary code, or causes the optimized binary code to be executed, on a machine. At each comparative sync point in the set or a subset of comparative sync points, the embodiment determines a state of the user data in the user space of the memory of the machine. The user data in the user space of the memory is that user data which is manipulated at the comparative sync point.

In one embodiment, the machine where the optimized binary code is executed is the new machine for which the optimized binary code has been compiled, or an equivalent thereof. A state of the user data in the user space of the memory of the new machine is a value of the user data in the user space of the memory of the new machine. In other words, when the comparative sync point is reached in the execution of the optimized binary code, the user data has been manipulated by either writing of a value corresponding to the user data at an address in the memory, reading of a value corresponding to the user data at an address in the memory, or both.

A state of the user data in the user space of the memory of the new machine at a comparative sync point is referred to herein as a new user data state. An embodiment compares the new user data state at a comparative sync point with the old user data state from the baseline at the corresponding sync point.

A result of the comparison shows whether a value of a user data according to an old user data state and a value of the user data according to a corresponding new user data state are the same, or similar within a tolerance threshold. If the values are the same or similar within the tolerance threshold, an embodiment concludes that a faulty operation has not occurred at the comparative sync point in the optimized binary code. If the values are not the same or similar within the tolerance threshold, the embodiment concludes that a faulty operation has occurred at the comparative sync point in the optimized binary code. Thus, when a faulty operation is identified by an embodiment, a user or a debugging tool can examine the binary code prior to the comparative sync point to isolate a cause of the faulty operation.

One embodiment visualizes the comparison process. For example, using a visualization tool, the embodiment presents to the user the listing file, highlights a sync point in the listing file, the identifier of the user data corresponding to the sync point from the baseline, the old user data state from the baseline, the new user data state at the comparative sync point, and an indication of whether the comparison found the values to be the same or similar within the tolerance threshold.

A key consideration in binary translation is to maintain or improve a performance of the optimized binary code relative to the performance of the initial binary code. Thus, modification of the optimized binary code, such as by insertion of debugging instructions is undesirable, because such insertions degrade the performance of the optimized binary code during execution. Furthermore, the binary optimization process itself should not (or only very minimally) be inhibited by the requirement for maintaining the sync points.

Note that in all the operations described herein, the optimized binary code remains unmodified. Therefore, the performance of the optimized binary code is unchanged from an exercise of an embodiment. Furthermore, the operations described herein for an embodiment occur outside of the execution of the optimized binary code, such as in another process that captures the new user data states from the memory by using the listing file and the baseline—all external to the optimized binary code and operating independently therefrom.

A method of an embodiment described herein, when implemented to execute on a device or data processing system, comprises substantial advancement of the functionality of that device or data processing system in performance neutral isolation of runtime discrepancies in binary code. For example, a known method of debugging binary code relies largely on preprogrammed debugging instructions in a high-level language source code or guesswork using inadequate memory dumps. An embodiment systematically examines the operations within an optimized binary code to detect those locations in the optimized binary code where user data is being manipulated in the memory. An embodiment compares the user data states at such points with user data states at corresponding points in the initial binary code. In this manner, an embodiment can isolate or locate with significant accuracy that portion of binary code where user data is different. Thus, a substantial advancement of such devices or data processing systems by executing a method of an embodiment is in pointing out with specificity those portions of the optimized binary code where a faulty operation might be occurring, and in providing comparative data to support the indication of a faulty operation in the optimized binary code.

The illustrative embodiments are described with respect to certain machines, architecture, compilers, debuggers, tools, programming languages, thresholds, visualizations, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
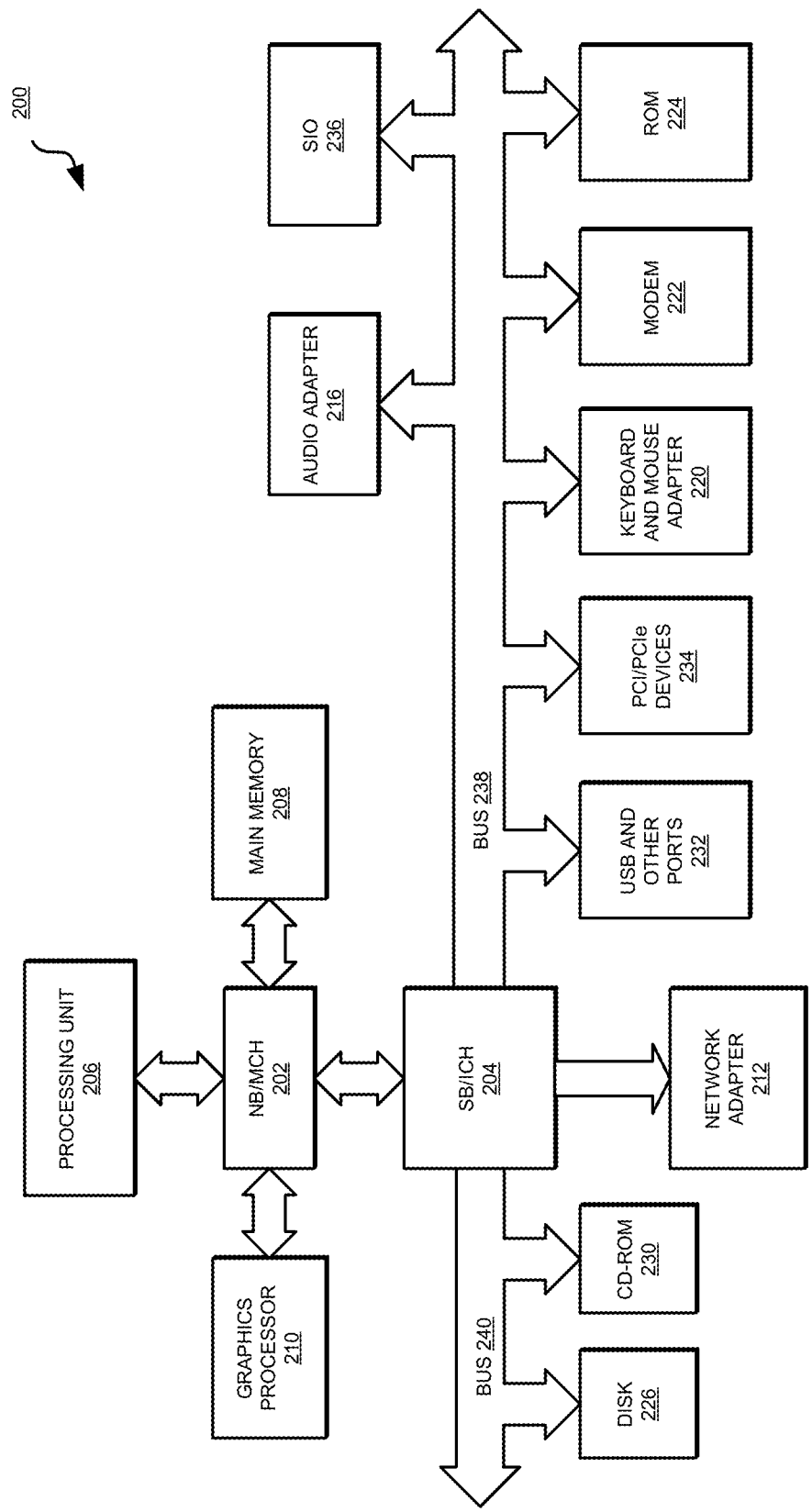
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. Assume that client 110 is an old machine and client 112 is a new machine as described herein. Application 107 is a binary optimization tool as described herein, which takes initial binary code 111 as input to produce optimized binary code 113 as output. Application 105 uses visualization tool 115 to identify a faulty operation, to wit, a runtime discrepancy, in optimized binary code 113.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), Linux® (Linux is a trademark of Linus Torvalds in the United States and other countries), iOS™ (iOS is a trademark of Cisco Systems, Inc. licensed to Apple Inc. in the United States and in other countries), or Android' (Android is a trademark of Google Inc., in the United States and in other countries). An object oriented programming system, such as the Java™ programming system, may run in conjunction with the operating system and provide calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Figure 3:
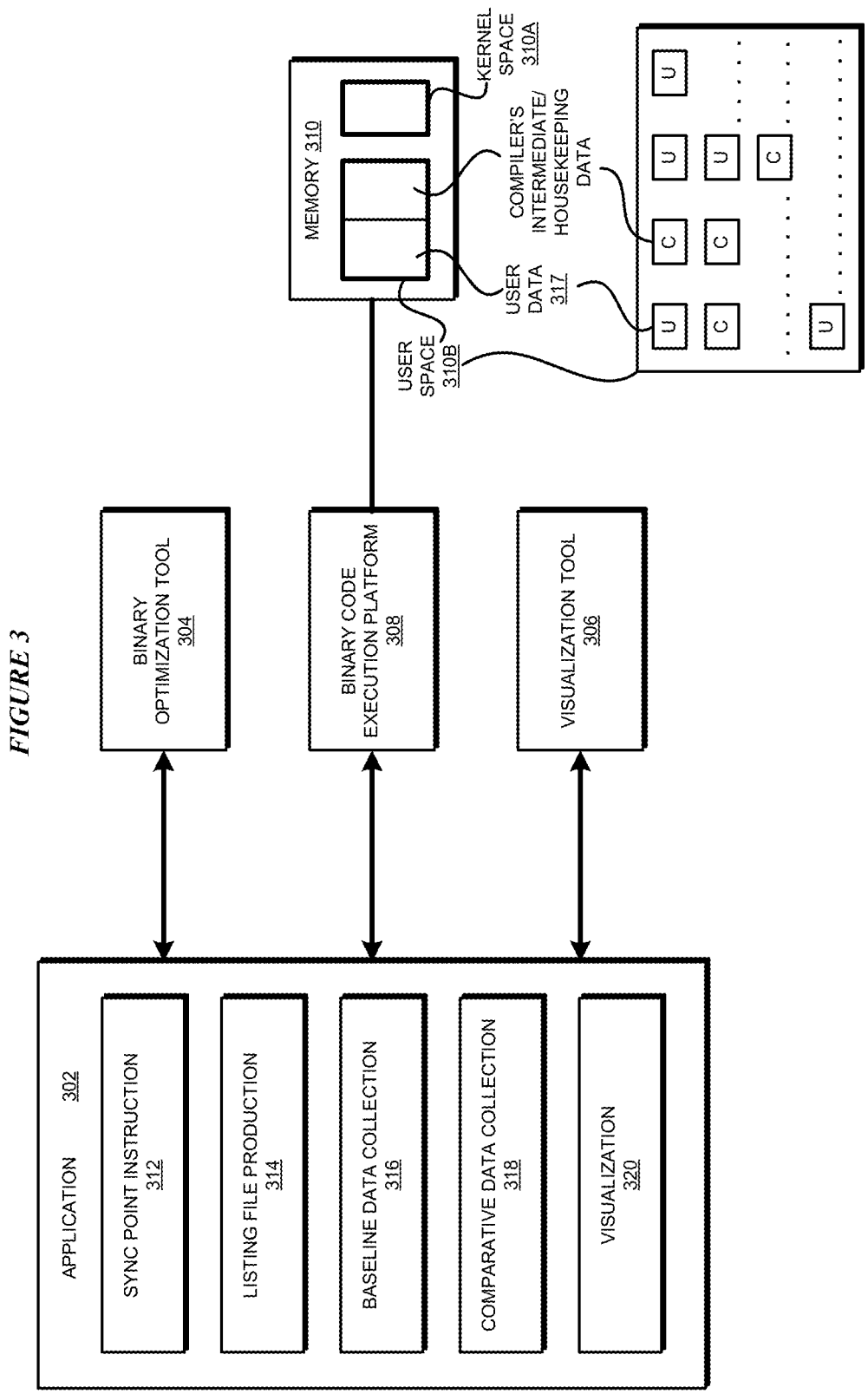
FIG. 3 depicts a block diagram of an example configuration for performance neutral isolation of runtime discrepancies in binary code in accordance with an illustrative embodiment.

With reference to FIG. 3, this figure depicts a block diagram of an example configuration for performance neutral isolation of runtime discrepancies in binary code in accordance with an illustrative embodiment. Application 302 is an example of application 105 in FIG. 1. Binary optimization tool 304 is an example of binary optimization tool 107 in FIG. 1. Visualization tool 306 is an example of visualization tool 115 in FIG. 1.

Only for the simplification and clarity of the description, assume that binary code execution platform 308 is a new machine, and an example of client 112 in FIG. 1. Further assume that an initial binary code and an optimized binary code can both be executed on platform 308, albeit with different efficiencies, the optimized binary code performing better than the initial binary code. Memory 310 is associated with platform 308, and is an example of memory 208 in FIG. 2. Memory 310 has kernel space 310A and user space 310B.

Component 312 causes the identification of, e.g., by constructs a command for identifying, a set of sync points in an initial binary code (not shown). As a non-limiting example, suppose that platform 308 is configured to execute the initial binary code and binary optimization tool 304 can identify user data manipulations in the initial binary code.

Component 312 causes the sync point identification command by binary optimization tool 304, e.g., by sending the sync point identification command to binary optimization tool 304. Binary optimization tool 304 returns a set of sync points. Component 314 produces a listing file from the set of sync points. In a similar manner, component 314 also causes binary optimization tool 304 to produce comparative sync points in an optimized binary code corresponding to the sync points in the initial binary code.

Component 316 causes platform 308 to execute the initial binary code. During the execution of the initial binary code, user data labeled "U" is created and manipulated in user space 310B. Compiler-introduced housekeeping operations create compiler's housekeeping data labeled "C" in user space 310B as well.

As an example, during the execution of the initial binary code, platform 308 identifies user data 317 as being manipulated at a sync point. Component 316 saves a state of user data 317 as an old state of user data 317, as baseline data for that sync point. Similarly, at different sync points in the listing file, platform 308 identifies one or more user data "U" being manipulated, and component 316 saves the state of that user data relative to a sync point.

Component 318 causes platform 308 to execute the optimized binary code. During the execution of the optimized binary code, user data labeled "U" is created and manipulated in user space 310B. Compiler-introduced housekeeping operations create compiler's housekeeping data labeled "C" in user space 310B as well.

As an example, during the execution of the optimized binary code, platform 308 identifies user data 317 as being manipulated at a comparative sync point. Component 318 saves a new state of user data 317 for that comparative sync point. Similarly, at different comparative sync points, platform 308 identifies one or more user data "U" being manipulated, and component 316 saves the new state of that user data relative to a corresponding comparative sync point.

Component 318 compares the old state of user data 317 with the new state of user data 317. If the value in the old state of user data 317 is the same or similar within a tolerance threshold to the value in the new state of user data 317, component 318 determines that no runtime discrepancy or faulty operation has occurred at or near the comparative sync point in the optimized binary code. If the value in the old state of user data 317 is not the same or similar within a tolerance threshold to the value in the new state of user data 317, component 318 determines that a runtime discrepancy or faulty operation has occurred at or near the comparative sync point in the optimized binary code.

Component 320 presents the sync point information, identifying information of user data 317, old and new values from the old and new states of user data 317, a result of the comparison, or some combination of these and other similarly purposed information on visualization tool 306. A user uses visualization tool 306 and the information presented thereon to debug or resolve the runtime discrepancy in the optimized binary code.

Figure 4:
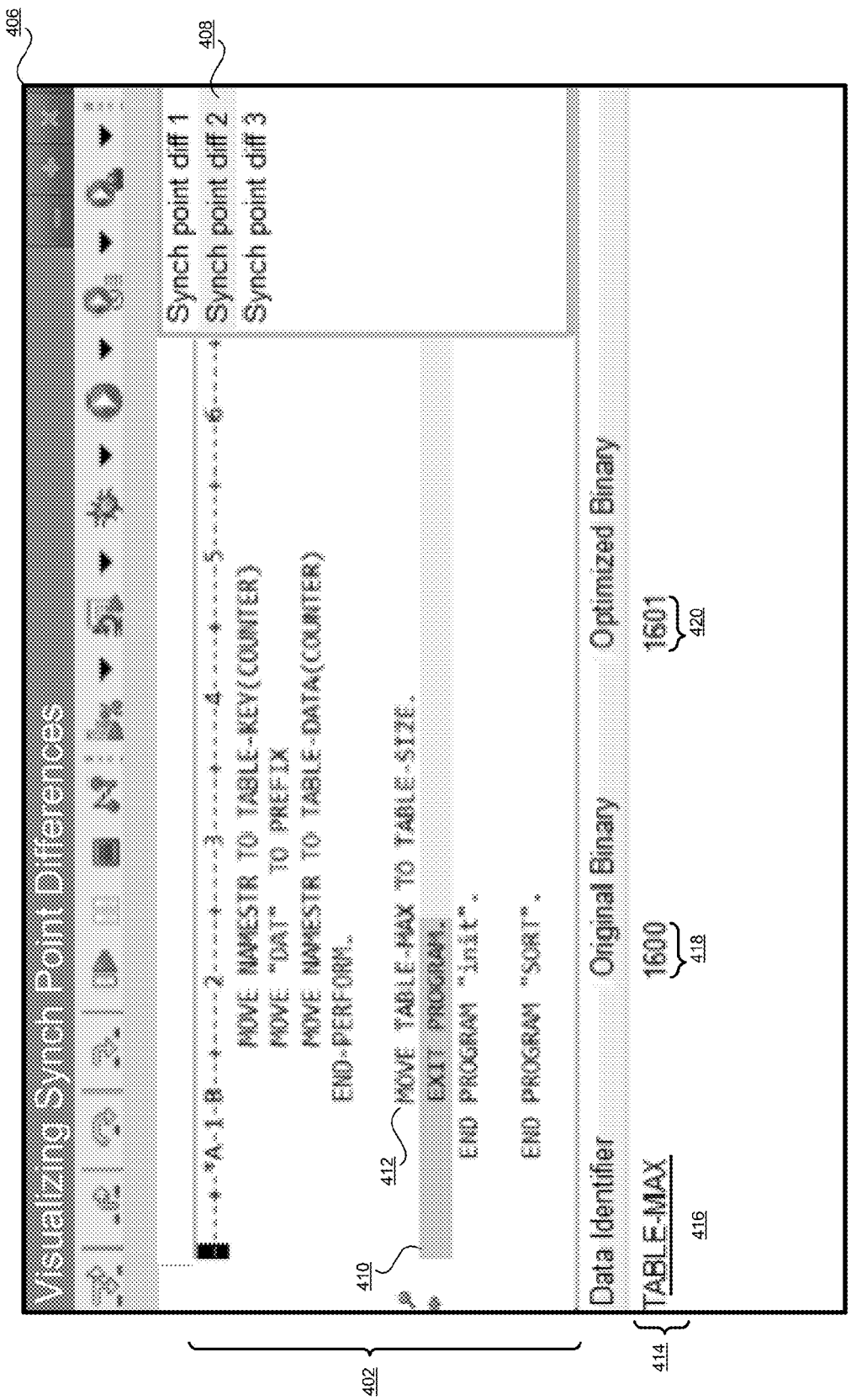
FIG. 4 depicts an example presentation of runtime discrepancy in an optimized binary code in accordance with an illustrative embodiment.

With reference to FIG. 4, this figure depicts an example presentation of runtime discrepancy in an optimized binary code in accordance with an illustrative embodiment. Non-limiting example visualization 406 is produced using visualization tool 306 in FIG. 3.

Visualization 406 shows a list of sync points, e.g., all or a portion of a listing file, in which example sync point 408 is listed (labeled "sync point 2"). Sync point 408 is identified at binary instruction 410, which follows binary instruction 412 where a binary operation equivalent of a "MOVE" operation is performed on user data "TABLE-MAX".

Note that a sync point can be identified at the instruction where user data is manipulated, e.g., at instruction 412, or after such an instruction at a safe point in the binary code, such as when a block of binary code is complete, e.g., instruction 410. A safe point is a point where the manipulation of the user data has completed and the value stored in the user data is unlikely to change due to another instruction. Note that while the visualization of FIG. 4 depicts code in window 402, where instructions 410 and 412 are depicted, and an embodiment where source code is unavailable will not show source code in window 402. The illustration of window 402 is not intended to be limiting on the embodiments. For example, one embodiment may show binary instructions in window 402 instead of source code. Another example embodiment may not show any code in window 402. Regardless, as described herein, a complier can determine by examining the binary code whether user data is being manipulated at a specific point in the binary code, and the sync point is inserted there. Therefore, row 414 can still be visualized in the manner of FIG. 4 regardless of whether window 402 can be visualized in the manner of FIG. 4 or in a different manner.

Row 414 shows that user data "TABLE-MAX" (416) had value 418 ("1600") in an old state of user data 416, but has value 420 ("1601") in a new state of user data 416. In one embodiment, a presence of row 414 is sufficient indication of a faulty operation or runtime discrepancy in the optimized binary code.

Figure 5:
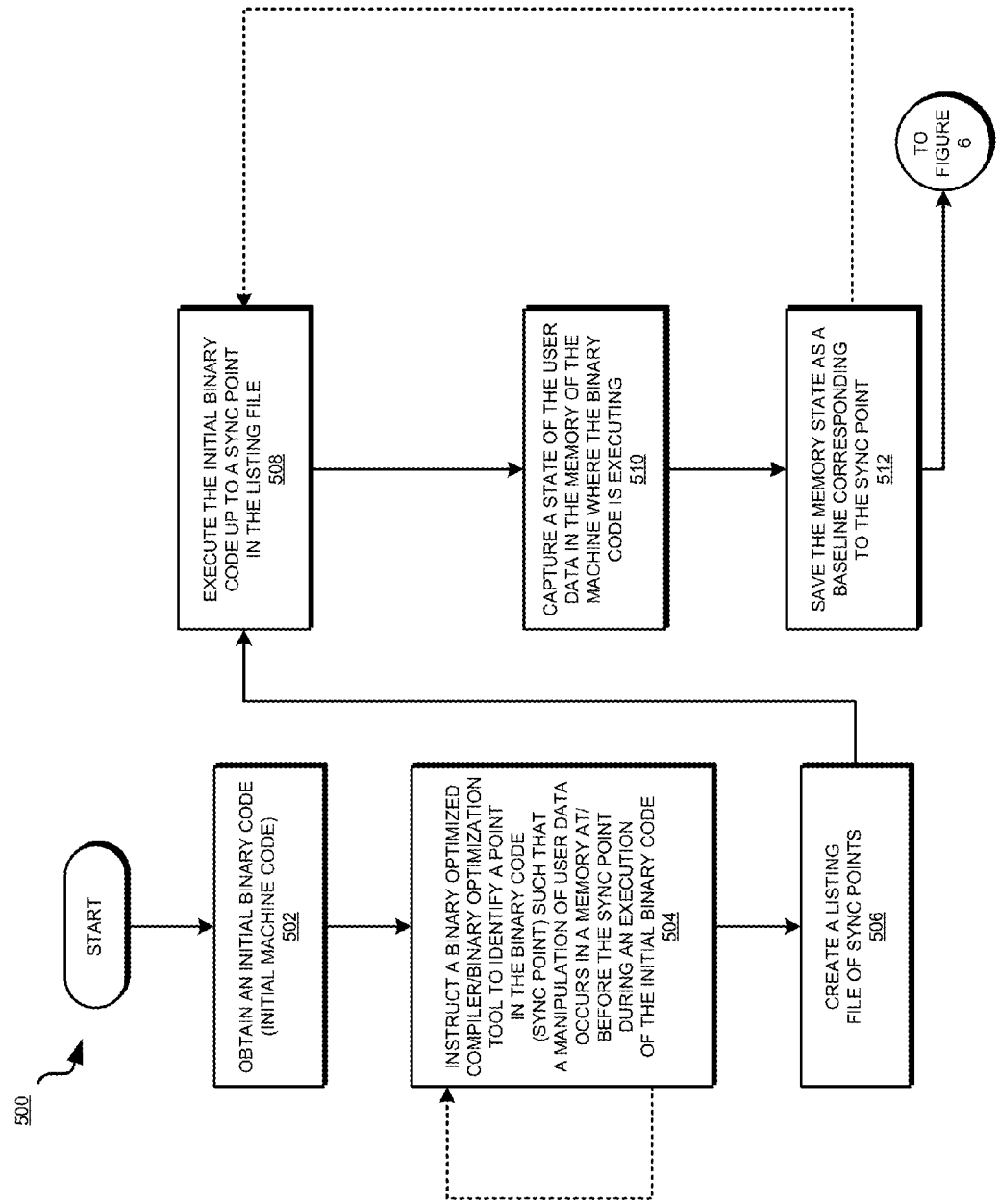
FIG. 5 depicts a flowchart of a part of an example process for performance neutral isolation of runtime discrepancies in binary code in accordance with an illustrative embodiment.

With reference to FIG. 5, this figure depicts a flowchart of a part of an example process for performance neutral isolation of runtime discrepancies in binary code in accordance with an illustrative embodiment. Process 500 can be implemented in application 302 in FIG. 3.

The application obtains or receives an initial binary code (block 502). The application instructs a binary optimization compiler, a binary optimization tool, or another compiler to identify a sync point (block 504). By sending one instruction or more, the application collects a set of sync points in the initial binary code and creates a listing file of sync points (block 506).

The application executes the initial binary code up to a sync point (block 508). The application captures a state of all or a part of the user data in the memory of the machine where the initial binary code is executing (block 510). The user data is the one whose manipulation is a reason for the sync point. The application saves the state of the user data as an old state in a baseline corresponding to the sync point (block 512).

The application repeats blocks 508-512 for as many sync points as may be encountered during the execution of the initial binary code, which need not be all the sync points in the listing file. Thereafter, the application proceeds to process 600 in FIG. 6.

Figure 6:
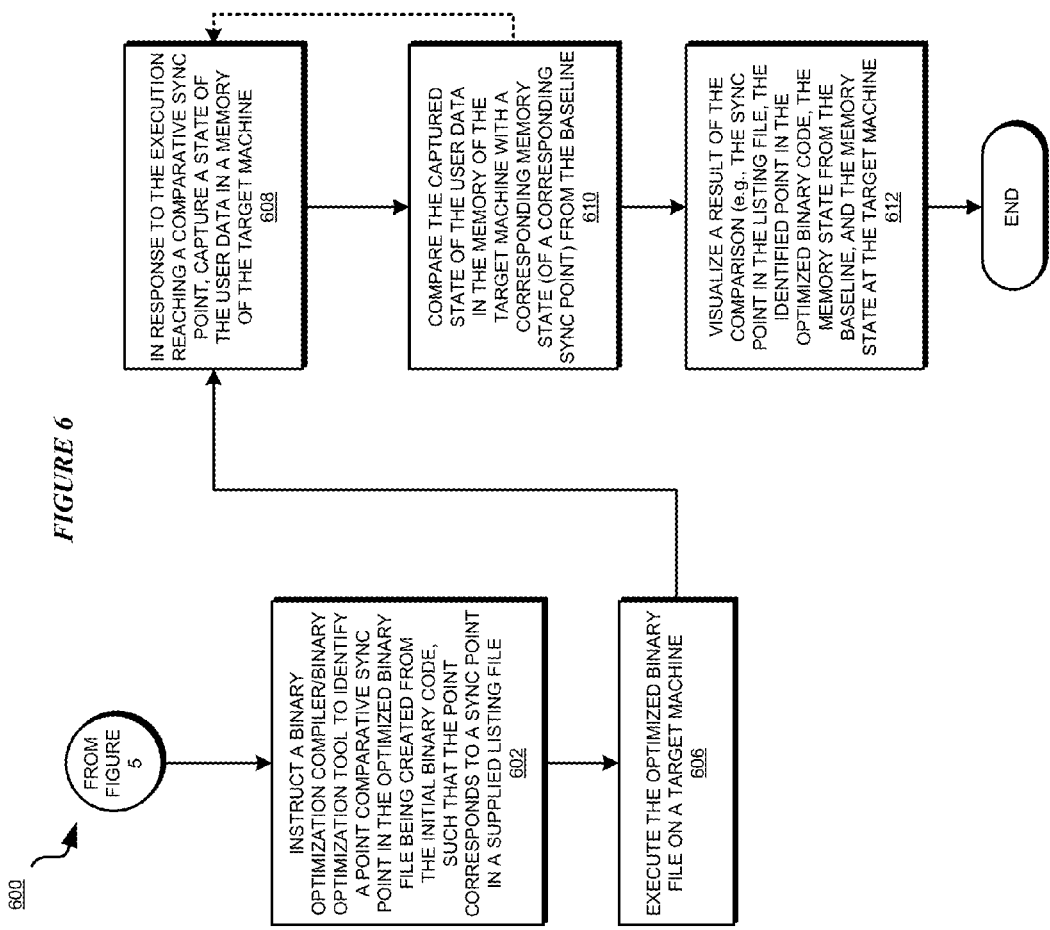
FIG. 6 depicts a flowchart of another part of the example process for performance neutral isolation of runtime discrepancies in binary code in accordance with an illustrative embodiment.

With reference to FIG. 6, this figure depicts a flowchart of another part of the example process for performance neutral isolation of runtime discrepancies in binary code in accordance with an illustrative embodiment. Process 600 can be implemented in application 302 in FIG. 3.

The application instructs a binary optimization tool or binary optimization compiler to identify comparative sync points in an optimized binary code that has been created from the initial binary code of block 502 in FIG. 5 (block 602). The comparative sync points correspond to sync points in the listing file created at block 506 in FIG. 5.

The application causes to be executed, or executes, the optimized binary code on a target machine (block 606). In response to the execution reaching a comparative sync point, the application captures, from a memory of the target machine, a state of the user data corresponding to the comparative sync point (block 608). The application compares the captured state at block 608 with the baseline saved state for the same user data of block 512 in FIG. 5 (block 610). Depending upon the comparison of block 610, the application may identify a faulty operation in the optimized binary code as described herein.

The application visualizes a result of the comparison (block 612). In a non-limiting example, the visualization may show the sync points in the listing file being used, the identified point in the optimized binary code being executed, the memory states from the baseline and the target machine, or some combination of these and other data. The application ends process 600 thereafter. The application repeats blocks 610 and 612 for as many comparative sync points as may be encountered during an execution of the optimized binary code.

Optionally, the application visualizes a result of the comparison of block 610 as described herein (block 612). The application ends process 600 thereafter.

Thus, a computer implemented method, system or apparatus, and computer program product are provided in the illustrative embodiments for performance neutral isolation of runtime discrepancies in binary code. Where an embodiment or a portion thereof is described with respect to a type of device, the computer implemented method, system or apparatus, the computer program product, or a portion thereof, are adapted or configured for use with a suitable and comparable manifestation of that type of device. Where an embodiment is described as implemented in an application, the delivery of the application in a Software as a Service (SaaS) model is contemplated within the scope of the illustrative embodiments. In a SaaS model, the capability of the application implementing an embodiment is provided to the consumer by executing the application on a cloud infrastructure. The application is accessible from various client devices through a thin client interface such as a web browser (e.g., web-based e-mail). The user does not manage or control the underlying cloud infrastructure including network, servers, operating systems, storage, or even the capabilities of the application, with the possible exception of limited user-specific application configuration settings.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   identifying, using a processor, without using a high-level programming language source code, in an initial binary code, a set of sync points, a sync point being a place in the initial binary code where a user data will have changed in a memory when the initial binary code is executed;
   executing, using the processor, the initial binary code at a first data processing system;
   capturing, using the processor, a value of the user data from a user space of the memory as a baseline of the user data;
   identifying, using the processor, in a second binary code, a set of comparative sync points, a comparative sync point being a place in the second binary code where the user data will have changed in a second memory when the second binary code is executed in a second data processing system;
   finding, using the processor, during an execution of the second binary code in the second data processing system, that a second value of the user data from a second user space of the second memory fails to match the baseline of the user data; and
   identifying, using the processor, responsive to the finding, an instruction before the comparative sync point in the second binary code as a location of a faulty operation.

2. The method of claim 1, further comprising:
   capturing, during the execution of the second binary code in the second data processing system, the second value of the user data from a second user space of the second memory; and
   determining, as a part of the finding, whether the second value of the user data is within a tolerance threshold of the baseline of the user data.

3. The method of claim 2, wherein the capturing occurs without an additional instruction in the second binary code.

4. The method of claim 1, wherein the instruction before the comparative sync point in the second binary code is distinct from the instruction in the initial binary code.

5. The method of claim 1, further comprising:
   translating the initial binary code into the second binary code using a second compiler, wherein the second data processing system uses a second instruction set, and wherein the second binary code is constructed by the second compiler using the second instruction set.

6. The method of claim 1, wherein the first data processing system uses a first instruction set, and wherein the initial binary code is constructed using the first instruction set.

7. The method of claim 1, further comprising:
   sending the initial binary code to a compiler;
   sending a command to the compiler to identify the set of sync points, wherein the compiler identifies a first binary operation in the initial binary code, the first binary operation changing the user data in the memory when executed; and
   identifying, using the compiler, the sync point at a second binary operation, wherein the second binary operation occurs in the initial binary code after the first binary instruction and in response to the changed user data being stable in the memory.

8. The method of claim 7, wherein a third binary operation in the initial binary code changes a compiler data in the memory, wherein the third binary instruction is inserted in the initial binary code by another compiler to manage a processing of a set of instructions, wherein the set of instructions are a result of the source code, and wherein the set of instructions include the first binary instruction but exclude the third binary instruction.

9. The method of claim 1, further comprising:
   presenting, in a visual presentation, an identifier of the user data, the baseline of the user data, the second value of the user data, and a location of the comparative sync point in the second binary code.

10. The method of claim 1, wherein the method is embodied in a computer program product comprising one or more computer-readable storage devices and computer-readable program instructions which are stored on the one or more computer-readable storage devices and executed by one or more processors.

11. The method of claim 1, wherein the method is embodied in a computer system comprising one or more processors, one or more computer-readable memories, one or more computer-readable storage devices and program instructions which are stored on the one or more computer-readable storage devices for execution by the one or more processors via the one or more memories and executed by the one or more processors.

12. A computer program product comprising one or more computer-readable storage devices, and program instructions stored on at least one of the one or more storage devices, the stored program instructions comprising:

program instructions to identify, using a processor, without using a high-level programming language source code, in an initial binary code, a set of sync points, a sync point being a place in the initial binary code where a user data will have changed in a memory when the initial binary code is executed;

program instructions to execute the initial binary code at a first data processing system;

program instructions to capture a value of the user data from a user space of the memory as a baseline of the user data;

program instructions to identify in a second binary code, a set of comparative sync points, a comparative sync point being a place in the second binary code where the user data will have changed in a second memory when the second binary code is executed in a second data processing system;

program instructions to find, during an execution of the second binary code in the second data processing system, that a second value of the user data from a second user space of the second memory fails to match the baseline of the user data; and program instructions to identify, responsive to the finding, an instruction before the comparative sync point in the second binary code as a location of a faulty operation.

13. The computer program product of claim 12, the stored program instructions further comprising:

program instructions to capture, during the execution of the second binary code in the second data processing system, the second value of the user data from a second user space of the second memory; and program instructions to determine, as a part of the finding, whether the second value of the user data is within a tolerance threshold of the baseline of the user data.

14. The computer program product of claim 13, wherein second value of the user data is captured from the second user space of the second memory without an additional instruction in the second binary code.

15. The computer program product of claim 12, wherein the instruction before the comparative sync point in the second binary code is distinct from a first instruction in the initial binary code.

16. The computer program product of claim 12, the stored program instructions further comprising:

program instructions to translate the initial binary code into the second binary code using a second compiler, wherein the second data processing system uses a second instruction set, and wherein the second binary code is constructed by the second compiler using the second instruction set.

17. The computer program product of claim 12, wherein the first data processing system uses a first instruction set, and wherein the initial binary code is constructed using the first instruction set.

18. The computer program product of claim 12, the stored program instructions further comprising:

program instructions to send the initial binary code to a compiler;

program instructions to send a command to the compiler to identify the set of sync points, wherein the compiler identifies a first binary operation in the initial binary code, the first binary operation changing the user data in the memory when executed; and program instructions to identify, using the compiler, the sync point at a second binary operation, wherein the second binary operation occurs in the initial binary code after the first binary instruction and in response to the changed user data being stable in the memory.

19. The computer program product of claim 18, wherein a third binary operation in the initial binary code changes a compiler data in the memory, wherein the third binary instruction is inserted in the initial binary code by another compiler to manage a processing of a set of instructions, wherein the set of instructions are a result of the source code, and wherein the set of instructions include the first binary instruction but exclude the third binary instruction.

20. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:

program instructions to identify, using a processor, without using a high-level programming language source code, in an initial binary code, a set of sync points, a sync point being a place in the initial binary code where a user data will have changed in a memory when the initial binary code is executed;

program instructions to execute the initial binary code at a first data processing system;

program instructions to capture a value of the user data from a user space of the memory as a baseline of the user data;

program instructions to identify in a second binary code, a set of comparative sync points, a comparative sync point being a place in the second binary code where the user data will have changed in a second memory when the second binary code is executed in a second data processing system;

program instructions to find, during an execution of the second binary code in the second data processing system, that a second value of the user data from a second user space of the second memory fails to match the baseline of the user data; and program instructions to identify, responsive to the finding, an instruction before the comparative sync point in the second binary code as a location of a faulty operation.

* * * * *